(12) United States Patent
Ahmadullin et al.

(10) Patent No.: US 10,223,348 B2
(45) Date of Patent: Mar. 5, 2019

(54) HIERARCHICAL PROBABILISTIC DOCUMENT MODEL BASED DOCUMENT COMPOSITION

(75) Inventors: Ildus Ahmadullin, Palo Alto, CA (US); Niranjan Damera-Venkata, Chennai Tamil Nadu (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 827 days.

(21) Appl. No.: 14/364,726

(22) PCT Filed: Mar. 6, 2012

(86) PCT No.: PCT/US2012/027877
§ 371 (c)(1),
(2), (4) Date: Jun. 12, 2014

(87) PCT Pub. No.: WO2013/133806
PCT Pub. Date: Sep. 12, 2013

(65) Prior Publication Data
US 2014/0372842 A1 Dec. 18, 2014

(51) Int. Cl.
*G06F 17/00* (2006.01)
*G06F 17/24* (2006.01)
*G06F 17/21* (2006.01)

(52) U.S. Cl.
CPC .......... *G06F 17/248* (2013.01); *G06F 17/217* (2013.01)

(58) Field of Classification Search
CPC ................................ G06F 17/212; G06F 17/24
USPC .................................. 715/202, 243, 200, 255
See application file for complete search history.

(56) References Cited

U.S. PATENT DOCUMENTS

| 5,633,996 | A | 5/1997 | Hayashi et al. | |
| 6,510,441 | B1 * | 1/2003 | Kenninga | G06F 17/211 715/234 |
| 7,434,159 | B1 * | 10/2008 | Lin | G06F 17/211 715/243 |
| 7,472,340 | B2 | 12/2008 | Burago et al. | |
| 7,627,600 | B2 | 12/2009 | Citron et al. | |
| 7,634,723 | B2 | 12/2009 | Layzell | |
| 7,756,871 | B2 * | 7/2010 | Yacoub | G06K 9/00469 707/736 |
| 8,234,571 | B1 * | 7/2012 | Menninga | G06F 17/211 715/243 |
| 9,460,089 | B1 * | 10/2016 | Rathod | G06F 17/214 |
| 2004/0168126 | A1 * | 8/2004 | Dunietz | G06F 17/217 715/251 |
| 2005/0055635 | A1 * | 3/2005 | Bargeron | G06F 17/248 715/251 |
| 2006/0026508 | A1 | 2/2006 | Balinsky et al. | |
| 2006/0193008 | A1 | 8/2006 | Osaka et al. | |

(Continued)

FOREIGN PATENT DOCUMENTS

WO  WO-2011053282  5/2011

*Primary Examiner* — Manglesh M Patel
(74) *Attorney, Agent, or Firm* — HP Inc. Patent Department

(57) ABSTRACT

A probabilistic content layout model generates pages. Each of a number of compositions flows over multiple of the pages, and one or more of the pages each has multiple breakpoints. Each breakpoint is defined in relation to a given composition, such that the breakpoint breaks the given composition on the page that includes the breakpoint and such that the given composition continues on, a subsequent page.

20 Claims, 6 Drawing Sheets

(56) References Cited

U.S. PATENT DOCUMENTS

| | | |
|---|---|---|
| 2006/0200759 A1* | 9/2006 | Agrawala ............. G06F 17/211 |
| | | 715/209 |
| 2008/0256440 A1 | 10/2008 | Borham et al. |
| 2009/0254814 A1* | 10/2009 | Lai ...................... G06Q 10/043 |
| | | 715/244 |
| 2010/0011287 A1 | 1/2010 | Osaka |
| 2012/0030033 A1 | 2/2012 | Damera-Venkata |
| 2012/0054600 A1* | 3/2012 | McCurdy .......... G06F 17/30268 |
| | | 715/243 |
| 2012/0084640 A1* | 4/2012 | Grams ................. G06F 17/217 |
| | | 715/235 |
| 2013/0014008 A1* | 1/2013 | Damera-Venkata ........................ |
| | | G06F 17/248 |
| | | 715/252 |
| 2013/0254655 A1* | 9/2013 | Nykyforov ........... G06F 17/211 |
| | | 715/244 |

* cited by examiner

HIERARCHICAL PROBABILISTIC DOCUMENT MODEL BASED DOCUMENT COMPOSITION

BACKGROUND

Content page layout is the process of laying out content on a printed or an electronically displayed page in an aesthetically pleasing manner. The types of content can include text as well as images. Traditionally, the content page layout process has been performed manually. For example, publishers of magazines and newspapers usually employ graphic designers that determine the best way in which to lay out text and images on pages in an esthetically pleasing manner, while at the same time adhering to general layout guidelines for their particular magazines or newspapers. As another example, more amateur users may select a predesigned template to lay out their content on pages as diverse as blogs, newsletters, and so on.

DETAILED DESCRIPTION

As noted in the background section, content page layout is the process of laying out content on a printed or an electronically displayed page in an aesthetically pleasing manner. Whereas traditionally the content page layout process has been performed manually, more recently automated approaches have been developed for achieving content page layout. For example, such automated approaches include probabilistic content page layout models.

Such probabilistic content page layout models can receive as input blocks of texts and images, as well as a number of generalized predesigned templates. A probabilistic content page layout model selects which template to use for each page, and modifies the template as appropriate. The probabilistic content page layout model then automatically populates the template with the input content without user interaction.

Examples of these types of probabilistic models include those described in two presently pending patent applications. The first patent application is the PCT patent application entitled "probabilistic methods and systems for preparing mixed-content document layouts," filed on Oct. 20, 2009, and assigned patent application number PCT/US2009/061320. The second application is the PCT patent application entitled "methods and systems for preparing mixed-content documents," filed on Oct. 28, 2009, and assigned patent application number PCT/US2009/062288.

Existing probabilistic content page layout models assume that there is at most one composition that will flow over multiple pages. A composition can be defined as a series of content blocks, such as text blocks, one or more of which may have corresponding images or other types of content that are to appear close to the blocks in question. If a composition does not fit on a given page, or for other reasons, then some content blocks of the composition appear on one page, and other content blocks of the composition appear on one or more subsequent pages.

What is referred to as a breakpoint for a page is defined in relation to a composition. A breakpoint breaks a composition on the page in question, such that the composition continues on a subsequent page. Existing probabilistic content page layout models are thus operable in relation to each page having at most one breakpoint. That is, on a given page, there is at most one composition that does not fit on the page, but rather continues on a subsequent page.

Techniques disclosed herein extend probabilistic content page layout models so that they contemplate and are operable in relation to more than one composition flowing over multiple pages. More specifically, techniques disclose herein provide probabilistic content page layout models in which one or more pages each has multiple breakpoints. For at least one page, then, there are multiple compositions that do not fit on the page, but rather continue on subsequent pages.

Figure 1:
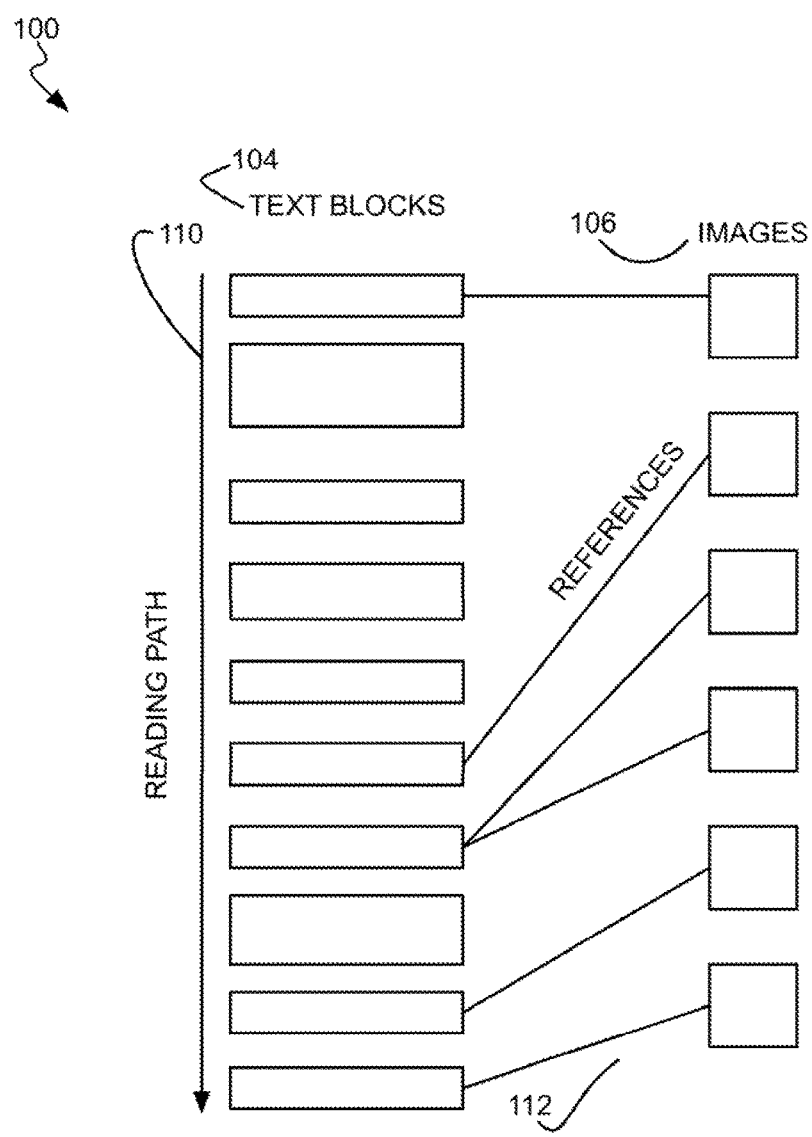
FIG. 1 is a diagram of an example composition that can be laid out over one or more pages, along with other such compositions, by a probabilistic content layout model.

FIG. 1 shows an example representation of a composition 100. The composition includes a number of text blocks 104, which are more generally content blocks. The text blocks 104 each contains text. More generally, a content block contains content, such as text, graphics, images, video, audio, and so on.

It is noted that the term composition as used herein refers to a set of text blocks that are typically organized around a common theme. For instance, a composition may be a blog entry, a journal article, or a newspaper article that may have one or more associated images. More technically, such a composition as the term is used herein may be considered a flow. In this respect, a composition is not to be considered a document composition that is made up of a number of such flows.

The text of a given text block 104 is to appear on the same page, and is not to be split over multiple pages. However, different text blocks 104 can appear on different pages. Some text blocks 104 have corresponding one or more images 106, per the references 112. Any image 106 that corresponds to a given text block 104 is desirably placed close to the given text block 104, and desirably after the text block 104 is presented on a page, as well as desirably on the same page as the given text block 104.

The text blocks 104 of the composition 100 are organized in a particular order 110. The particular order 110 corresponds to the reading path in which the text blocks 104 are presented on the pages. Thus, an earlier text block 104 appears before a later text block 104; the latter block 104 may appear on a page subsequent to the page on which the former text block 104 appears, but not on a prior page.

Figure 2:
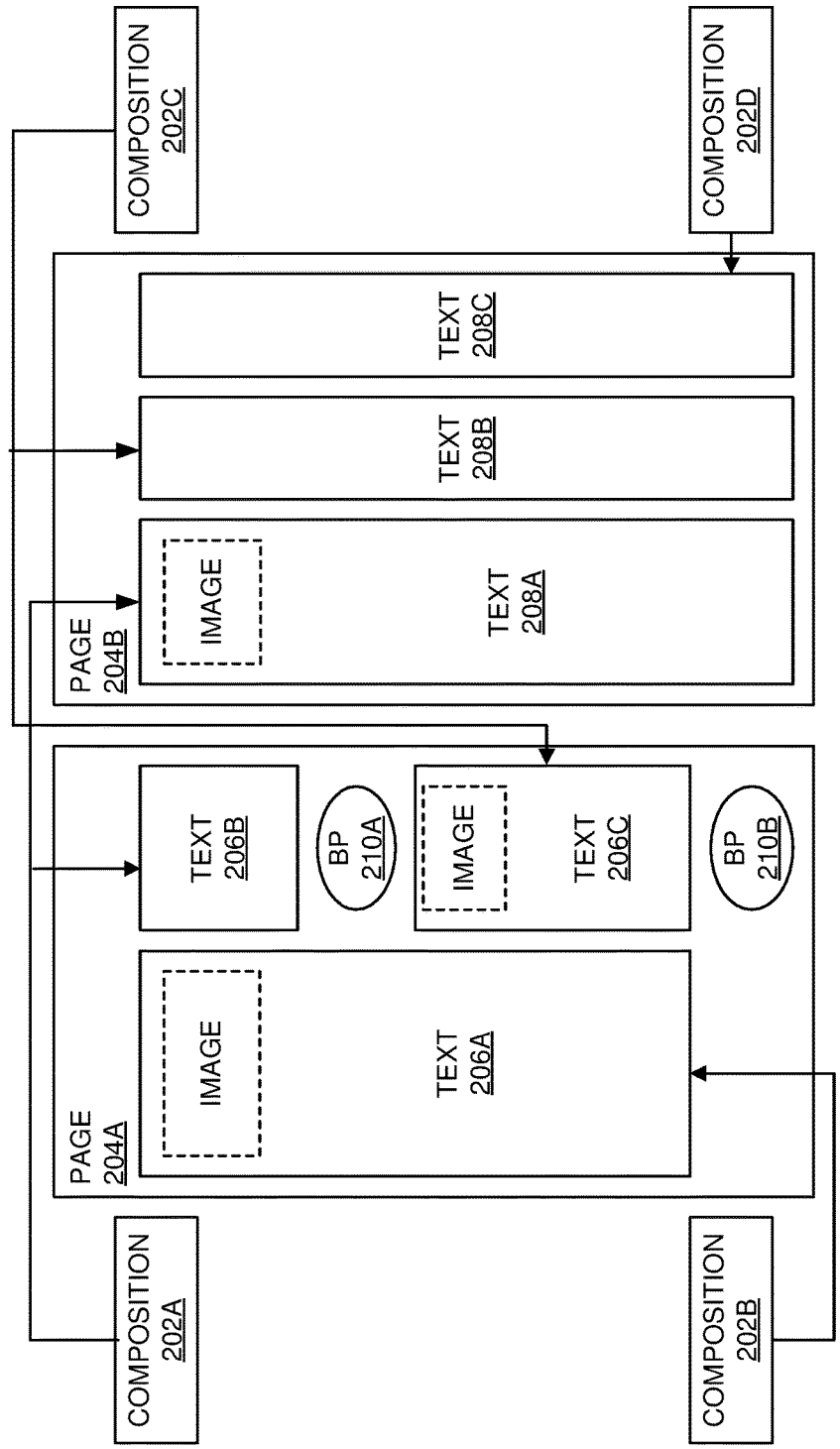
FIG. 2 is a diagram depicting example operation of a probabilistic content layout model in relation to multiple compositions, where more than one composition flows over multiple pages.

FIG. 2 shows a representative example of how a probabilistic content layout model generally works in relation to multiple compositions 202A, 202B, 202C, and 202D, collectively referred to as the compositions 202, where more than one composition 202 flows over multiple pages 204A and 204B, which are collectively referred to as the pages 204. Each composition 202 can be of the form of the composition 100 that has been described. A probabilistic content layout model thus processes the content blocks of each composition 202, starting at the first content block of each composition 202, and lays out successive pages 204 that include these content blocks and any associated images.

In general, for each page 204, the probabilistic content layout model selects which of a number of generalized predesigned master templates to use in a probabilistic manner, based on the content blocks of the compositions 202 and their associated images. The model adjusts and then populates the selected master template with some of the content blocks and the corresponding images of at least some of the compositions 202, in a process that is described in more detail below. The page 204A includes regions 206A, 2068, and 206C, which are collectively referred to as the regions 206. Likewise, the page 204B includes regions 208A, 208B, and 208C, which are collectively referred to as the regions 208. Although each page 204 has two regions 206 or 208, in general the regions on each page can be the same or different in number.

The probabilistic content layout model populates a given region 206 or 208 with content blocks, and any associated images, from just one composition 202. Stated another way, content from more than one composition 202 cannot populate the same region 206 or 208. For each region 206 and 208 of each page 204, the probabilistic content layout model selects which of a number of generalized predesigned region templates of the master template for the page 204 to use in a probabilistic manner, based on the content blocks of the compositions 202 and their associated images. The model adjusts and then populates the selected region template with some of the content blocks and the corresponding images one of the compositions 202.

A page is considered a printed page or an electronically displayed page. A printed page may have a size no greater than the size of a medium sheet, such as paper, on which the page is printed. In this case, any images associated with the content blocks of the compositions 202 are static images. By comparison, an electronically displayed page has a size no greater than the size of the display on which the page is displayed, so that each page does not extend over multiple sheets. As such, a page is completely displayable on the display, and scrolling is unnecessary to view the page completely on the display. Furthermore, in this case the any images associated with the content blocks of the compositions 202 can include both static images as well as moving images—i.e., video that may or may not include audio.

As depicted in the example of FIG. 2, the composition 202A flows over both pages 204, including the region 206B of the page 204A and the region 208A of the page 204B. As laid out in the example of FIG. 2, the region 206B includes just text of the composition 202A, whereas the region 208A includes both an image and text of the composition 202A. The composition 202B is completely located in just the region 206A of the page 204A, and does not flow over to the page 204B. The region 206A includes both an image and text of the composition 202B as laid out in the example of FIG. 2.

The composition 202C also flows over both pages 204, including the region 206C of the page 204A and the region 208B of the page 204B. As laid out in the example of FIG. 2, the region 206C includes both an image and text of the composition 202C, whereas the region 208B includes just text of the composition 202G. The composition 202D is completely located in just the region 208C of the page 204B, and does not flow over from the page 204A. The region 208C includes just text of the composition 202D as laid out in the example of FIG. 2.

The page 204A includes multiple breakpoints 210A and 210B, which are collectively referred to as the breakpoints 210. The breakpoint 210A is defined in relation to the composition 202A, and the breakpoint 210B is defined in relation to the composition 202G. The breakpoint 210A breaks the composition 202A on the page 204A, such that the composition 202B continues on the subsequent page 2046. Likewise, the breakpoint 210B breaks the composition 202C on the page 204A, such that the composition 202C continues on the subsequent page 204B.

Each composition 202 that flows over multiple pages 204 has one or more breakpoints 210 that are defined in relation to the composition 202. By comparison, each composition 202 that appears completely on one page 204 has no breakpoints 204 that are defined in relation to the composition 202. As such, in the example of FIG. 2, no breakpoints 210 are defined in relation to the compositions 202B and 202D, which appear completely on the pages 204A and 204B, respectively. Furthermore, the last page 204B does not include any breakpoints 210, because there are no subsequent pages 204 on which compositions 202 can continue.

Figure 3:
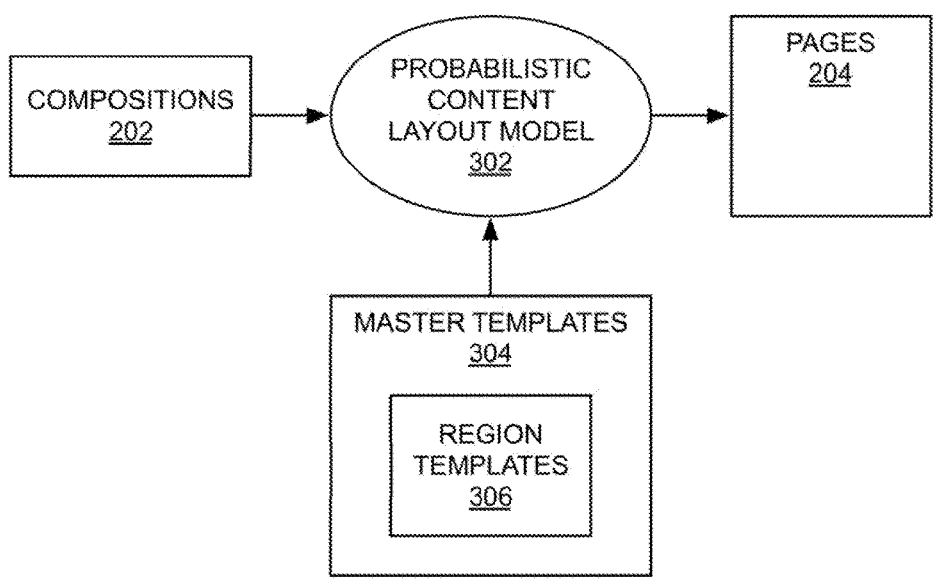
FIG. 3 is a diagram depicting example input and output of a probabilistic content layout model.

FIG. 3 shows example input and output of a probabilistic content layout model 302. The probabilistic content layout model 302 receives as input the compositions 202, as well as a number of generalized and predesigned master templates 304. The master templates 304 define the regions of a page, and include one or more generalized and predesigned region templates 306 for each region thereof. The master templates 304 can thus be considered page templates. The master templates 304, including the region templates 306, are typically provided to the probabilistic model 302 before the model 302 is actually used to generate the pages 204 on which the compositions 202 have been laid out.

Once the master templates 304, including the region templates 304, have been input into the probabilistic content layout model 302, and after the compositions 202 have been input as well, the probabilistic model 302 generates the pages 204 with the compositions 202 laid out on them without any user interaction. In general, the probabilistic content layout model 302 is a page layout model and is a content model in that it lays out content on the pages 204. The model 302 is a probabilistic model in that it uses probabilistic techniques to determine which compositions 202 and how the compositions 202 are displayed on the pages 204.

The model 302 is further a probabilistic model in that it is a priori non-deterministic. That is, the master templates 304 and the region templates 306 are generalized and predesigned templates, and further are probabilistic page layout templates. The templates 304 and 306 do not absolutely specify where a given type of content is to be placed within a region and/or on a page 204. Rather, the templates 304 and 306 are more generalized, and indicate in effect general guidelines as to how various types of content should be placed within a region and/or on a page 204. The probabilistic aspect of a template 304 or 306 results from manipulation of the general guidelines in content placement resulting in a greater or a lesser probability as to how aesthetically pleasing a result page or region layout using the template as a guide will likely be.

For example, depending on which parts of which compositions 202 are to be placed within which regions of a given page 204, the templates 304 and 306 may provide general guidelines as to how much images of these compositions 202 can be resited, cropped, and scaled, and how much the distance between the content blocks of these compositions 202 and the images can be adjusted. The probabilistic content layout model 302 then adjusts these parameters based on the actual content blocks and images to be placed within a region of the page 204. The resulting laid-out page 204 may ultimately have a probabilistic score corresponding to how aesthetically pleasing the page 204 is.

This process is selectively repeated for each page 204 using a variety of different (or the same) templates 304 and 306. The probabilistic content layout model may select templates 304 and 306 that result in the highest overall probabilistic score for the pages 204 as a group. Therefore, for a given page 204, the probabilistic score for the selected templates 304 and 306 may be less than the probabilistic score if different templates 304 and 306 were selected. However, if the total probabilistic score of all the pages 204 is nevertheless higher, then the latter templates 304 and 306 may not be selected for the given page 204.

It is noted that the probabilistic content layout model 302 can be considered as being for each template 304 and/or 306, insofar as the templates 304 and 306 include parameters that can be adjusted by the probabilistic model 302. Stated another way, for a given template 304 and/or 306, the probabilistic content layout model 302 is a probabilistic model for the template in question. As such, the parameters of a template can be considered as the parameters of the probabilistic content layout model itself, in relation to this template.

Figure 4:
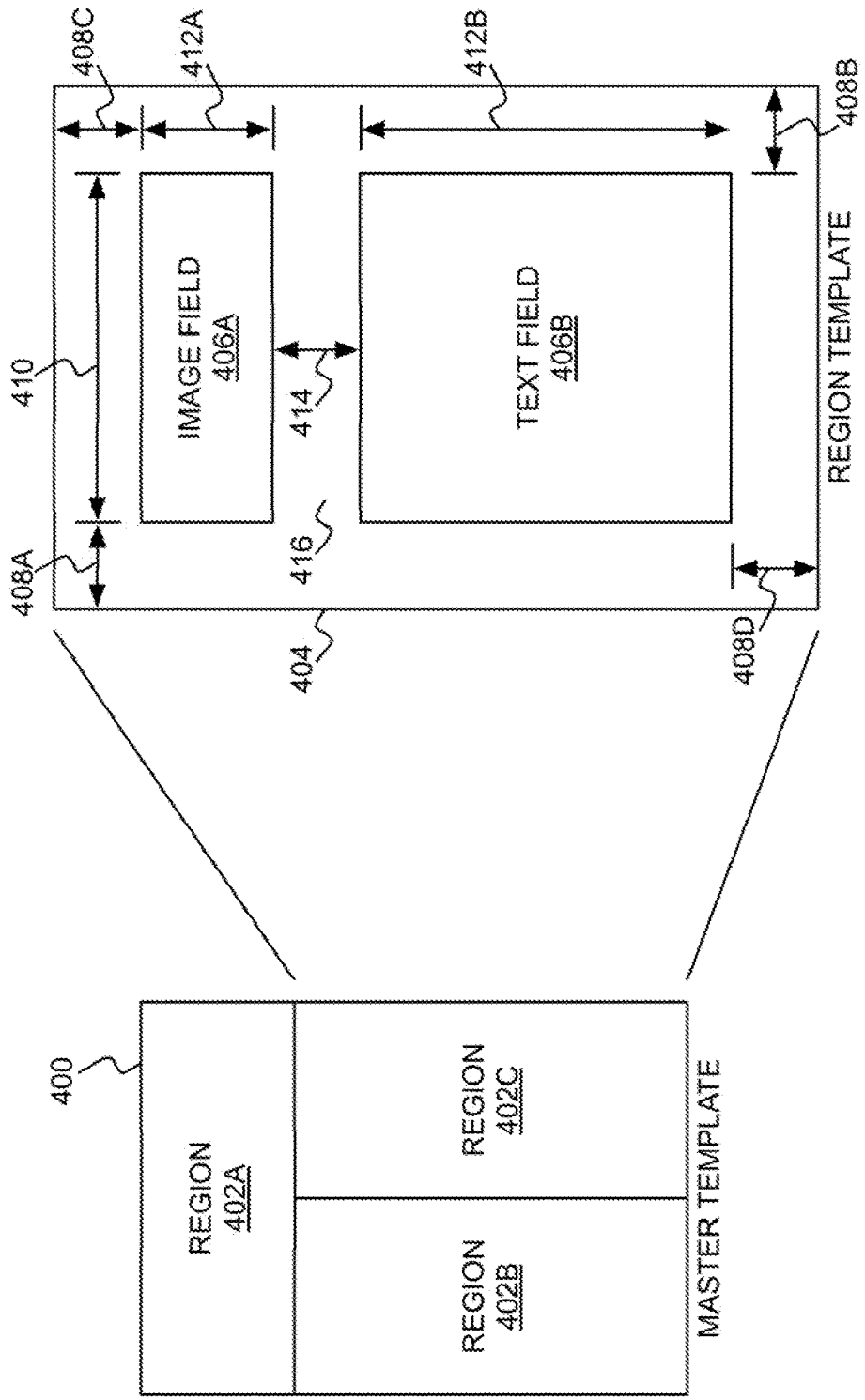
FIG. 4 is a diagram depicting the representative relationship between an example master template and an example region template.

FIG. 4 shows the representative relationship between an example master template 400 and an example region template 404. The master template 400 includes three regions 402A, 402B, and 402C, which are collectively referred to as the regions 402. For each region 402, the master template 400 includes a number of region templates. The region template 404 is one such region template for the region 402C.

The region template 404 includes an image field 406A and a text field 406B, which are collectively referred to as the fields 406. Parameters of the region template 404 include a left margin 408A, a right margin 408B, a top margin 408C, and a bottom margin 408D, which are collectively referred to as the margins 408. The width 410 of the fields 406 can be defined by a constant times a parameter, where the parameter may be adjusted by the probabilistic content layout model 302.

The height 412A of the image field 406A may also be defined by a constant times a parameter that the probabilistic content layout model 302 can adjust. By comparison, the height 412B of the image field 406B may be specified by a static constant that the probabilistic model 302 cannot adjust. However, the height 414 of the white space 416 between the fields 406A and 406B may be defined by a parameter that the probabilistic model 302 can adjust.

The various parameters that have been described in relation to FIG. 4 are examples of aesthetics parameters. An aesthetic parameter can be a region aesthetic parameter or a page aesthetic parameter. A region aesthetic parameter governs how the region appears on a page, such as how content appears within the region on a page. A page aesthetic parameter governs the page itself, such as how content appears on the page itself.

An example mathematical formulation of a probabilistic content layout mode that flows multiple compositions over multiple pages such that at least one of the pages has multiple breakpoints is now described. After this description, the mathematical formulation of such an example probabilistic model is narratively reduced to various example methods. The detailed description then concludes with a discussion of an example computing system that implements such a probabilistic content layout model.

A probabilistic content layout model can be mathematically specified by $$\mathbb{P}(\mathcal{D}; I; J_0; \ldots ; J_{I-1}) = \prod_{i=0}^{I-1} \mathbb{P}(A_i)\mathbb{P}(B_i)\mathbb{P}(C_i) \prod_{j=0}^{J_i-1} \mathbb{P}(D_j)\mathbb{P}(E_j).$$

In $\mathbb{P}(\mathcal{D}; I; J_0; \ldots, J_{I-1})$ specifies the aesthetic probability this formulation, distribution for a document $\mathcal{D}$ that includes compositions, as laid out over multiple pages I. A given page i has regions $J_i$.

The probability distribution $\mathbb{P}(A_i)$ selects a master template for the given page i. The probability distribution $\mathbb{P}(E_j)$ selects a region template for a given region j of the given page i. The probability distributions $\mathbb{P}(B_i)$ and $\mathbb{P}(D_j)$ set one or more region aesthetic parameters or the given region j of the given page i. The probability distribution $\mathbb{P}(C_i)$ fits the compositions into the given page i.

Within the probability distributions $\mathbb{P}(A_i)$ and $\mathbb{P}(E_j)$, $A_i=M_i$ and $E_j=T_{i,j}|M_i$, where $M_i$ is the master template for the given page i, and $T_{i,j}$ is the region template for the given region j of the given page i. Furthermore, within the probability distributions $\mathbb{P}(B_i)$ and $\mathbb{P}(D_j)$. $B_i=\Theta_i|T_i$ and $D_j=\Theta_{i,j}|T_{i,j}$, where $\Theta_i$ are region aesthetic parameters for the region templates of the regions of the given page i. $T_i$ are the region templates for the regions of the given page i, and $\Theta^{i,j}$ are the region aesthetic parameters for the region template $T_{i,j}$ of the given region j of the given page i.

Within the probability distribution $\mathbb{P}(C_i)$, $C_i=d_{\leq i}|d_{\leq i-1}$, $\Theta_i$, $\{T_{i,j}\}_{j=0}^{J_i-1}$, $M_i$. In $C_i$, $d_{\leq i-1}$ are content blocks of the compositions that have been fitted to any page prior to the given page i. Furthermore, $d_{\leq i}$ are the content blocks of the compositions that have been fitted to any page prior to the given page i and that are to be fitted to the given page i.

A given parameter may be considered a region parameter and/or a template parameter. For example, the height of a particular region may be specified by the master template itself, in which case the associated parameter is a template parameter, and/or by the template for this region, in which case the associate parameter is a region parameter. In either case, a prior probability distribution can specify a preferred value for the parameter, such as the preferred value of the height of the region. The compositions are then attempted to be fit to the region to adhere to this preferred height value, which can be modified in accordance with the probabilistic model.

In this respect, then, the breaks of the compositions, or flows, on a particular page are flexible. That is in accordance with the probabilistic content layout model, where a particular composition breaks in flow on a given page is not pre-specified. Rather, the flow break is dynamic, and can modified based on the various parameters and their prior probability distributions, or priors, in accordance with the probabilistic content layout model itself.

Figure 5:
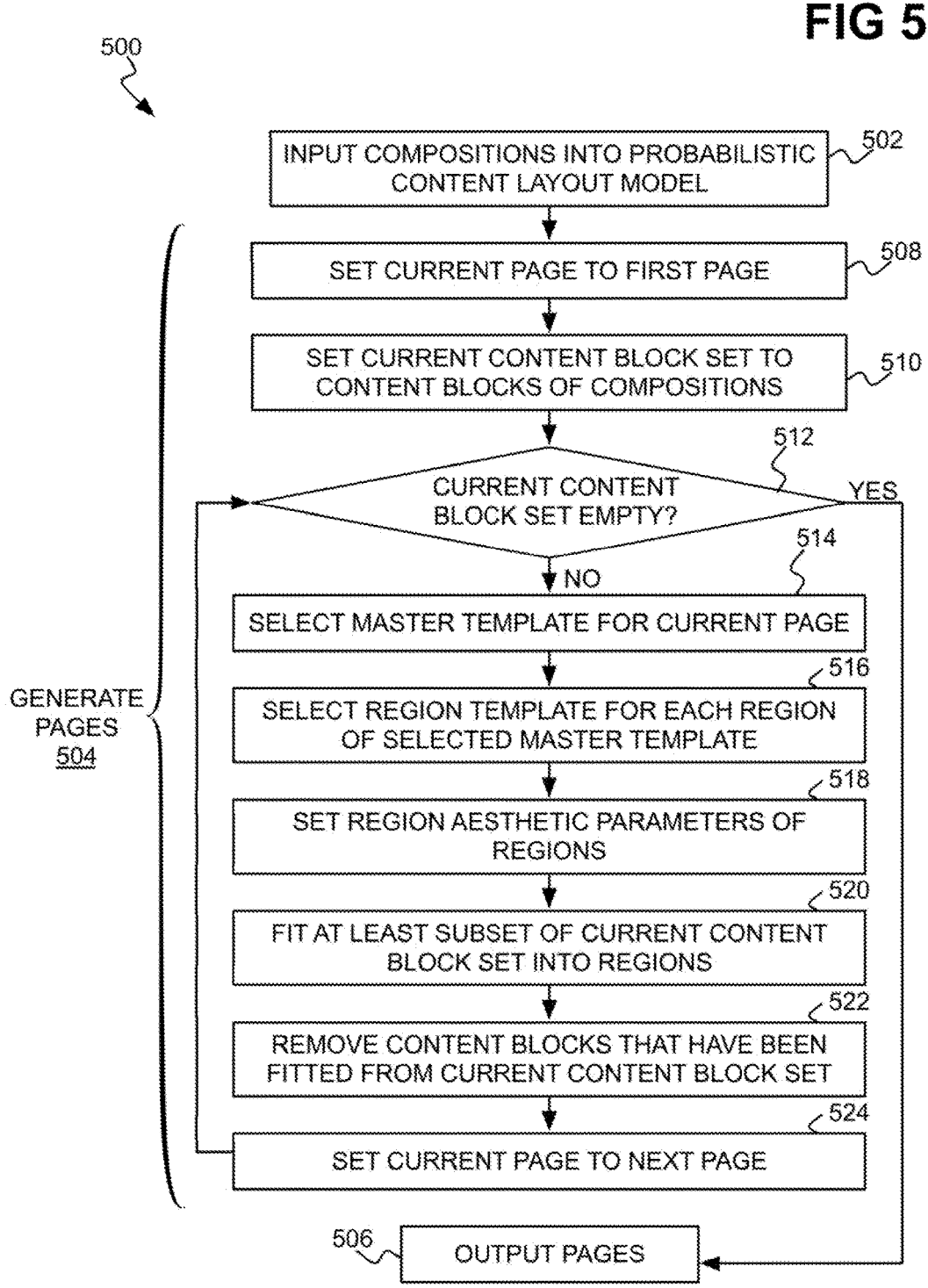
FIG. 5 is a flowchart of an example method for using a probabilistic content layout model to flow multiple compositions over multiple pages.

FIG. 5 shows an example method 500 for laying out multiple compositions over multiple pages, using a probabilistic content layout model, where at least one page has multiple breakpoints. The compositions are input into the probabilistic content layout model (502). If the probabilistic content layout model does not include master templates having region templates, then such templates are also input into the probabilistic model.

The probabilistic content layout model generates the pages, such that multiple compositions flow over multiple pages, and such that at least one page has multiple breakpoints (504). The pages are then output (506). For instance, the pages may be printed on paper or other media for distribution, or may be displayed on a display device for viewing, and so on.

Generation of the pages by the probabilistic content layout model includes the following, which is what the foregoing mathematical formulation of an example such model effectively performs in a probabilistic manner. What is referred to as a current page is set to a first page (508). What is referred to as a content block set is set to the content blocks of the compositions that have been input (510), such as all the content blocks of these compositions.

If the current content block set is not empty (512), then a master template is selected for the current page from one or more master templates (514). For each region of the selected master template, a region template is selected from one or more region templates (516). Region aesthetic parameters are set for the regions (518)—i.e., for the selected region templates for these regions. At least a subset of the current content block set is fitted into the regions of the selected master template for the current page (520). Parts 512, 514, 516, and 518 therefore generate the current page, laying out content from the compositions onto the page in an aesthetically pleasing manner without user involvement.

The current page can include multiple breakpoints pursuant to the example mathematical formulation of the probabilistic content layout model that has been described. That is, two or more compositions may not completely fit on the current page. A portion of each such composition appears on the current page, and a remaining portion of each such composition appears on one or more subsequent pages.

The content blocks of the subset that has been fitted into the regions of the selected master template for the current page are removed from the current content block set (522), so that these content blocks are not reused on any subsequent page. The current page is set to a next page (524), and the method 500 is repeated at part 512. At some point, all the content blocks of all the compositions will have been fitted on generated pages. In this case, the current content block set becomes empty, and the method 500 proceeds from part 512 to part 506.

As noted above, the method 500 explicates the example mathematical formulation of a probabilistic content layout model that has been described, particularly in part 504. Each of the parts 514, 516, 518, and 520 is performed probabilistically within this model. The generated pages are therefore the collection of pages that in total realize a probabilistically aesthetically highest layout of the compositions on the pages, without having to involve the user in making layout-oriented decisions.

Figure 6:
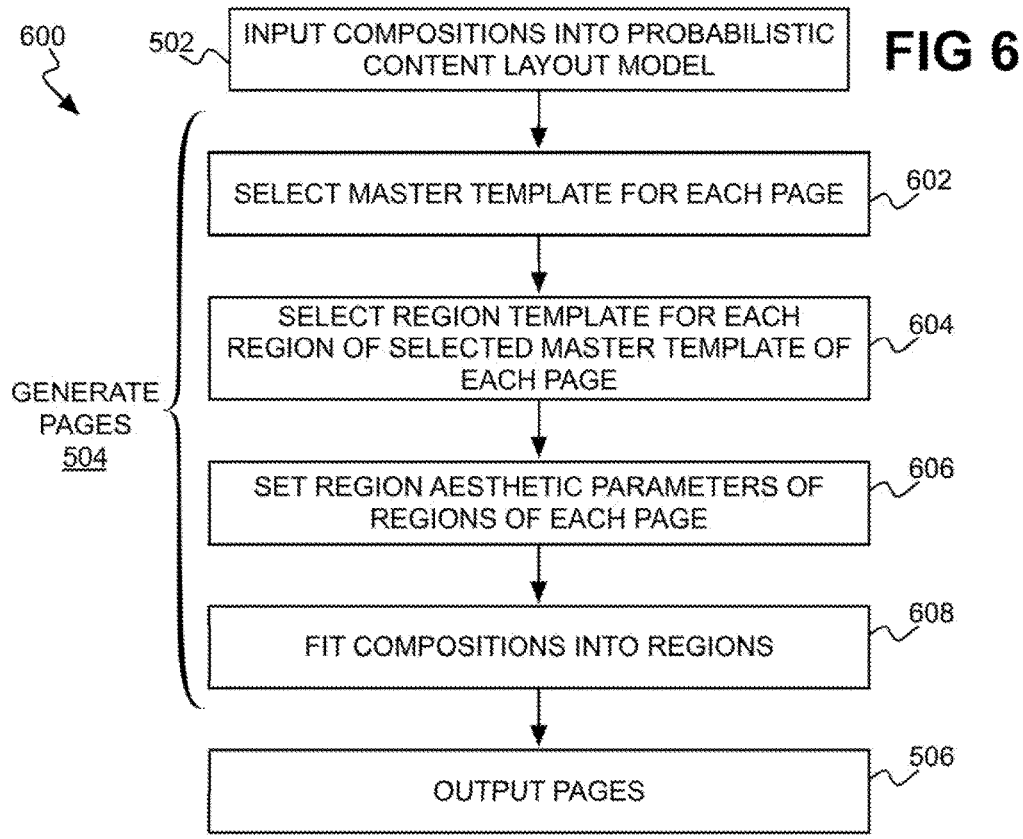
FIG. 6 is also a flowchart of an example method for using a probabilistic content layout model to flow multiple compositions over multiple pages, but which is more general than that of FIG. 5.

FIG. 6 shows an example method 600 that generalizes the method 500 of FIG. 5. Compositions are again input into a probabilistic content layout model (502), as before, and the probabilistic content layout model generates pages over which the compositions flow, where at least one page has multiple breakpoints (504). The pages are then output (506), also as before.

Generation of the pages by the probabilistic model more generally than in FIG. 5 includes the following, which is what the foregoing mathematical model of an example such model effectively performs in a probabilistic manner. A master template, from one or more such master templates, is selected for each page (602). A region template, from one or more such region templates, is selected for each region of the selected master template for each page (604). Region aesthetic parameters of the regions of each page are set (606), and the compositions are fitted into the pages' regions (608).

Figure 7:
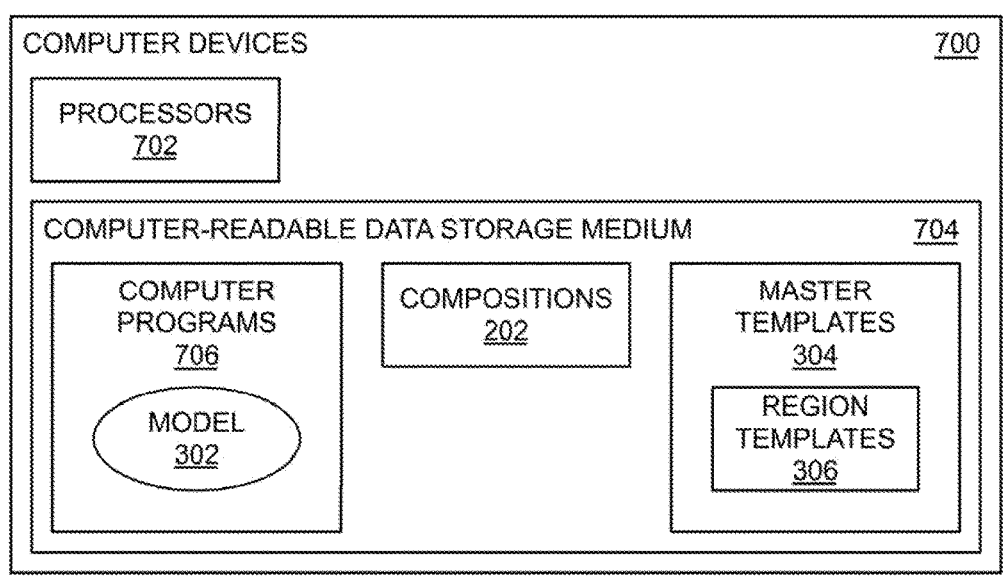
FIG. 7 is a diagram of an example computing system that can implement the example method of FIG. 5 or the example method of FIG. 6.

In conclusion, FIG. 7 shows an example system implemented as one or more computing devices 700. The computing devices 700 include hardware such as one or more processors 702 and a computer-readable data storage medium 704. The computing devices 700 can and typically will include other hardware as well, in addition the processors 702 and the data storage medium 704.

The computer-readable data storage medium 704 stores one or more computer programs 706 that implement the probabilistic content layout model 302. The data storage medium 704 further stores the compositions 202 that are input into the probabilistic model 302. The data storage medium 704 also stores the master templates 304, including the region templates 306, which are input into the probabilistic model 302, and stores the pages 204 that are output by the probabilistic model 302.

Therefore, execution of the computer programs 706 by the processors 702 from the computer-readable data storage medium 704 causes the probabilistic content layout model 302 to receive the compositions 202 and the templates 304 and 306 as input. On the basis of this input, the probabilistic model 302 generates the pages 204 as output. The model 302 generates the pages 108 as has been described above, such as in accordance with the method 500 or 600.

The methods 500 and 600 thus can each be implemented as one or more computer programs stored on a computer-readable data storage medium, such as a volatile or a non-volatile such medium. A processor of a computing system executes the computer programs from the computer-readable data storage medium to realize performance of the method in question. The computing system can include one or more computing devices.

We claim:

1. A non-transitory computer-readable data storage medium having a computer program stored thereon, wherein execution of the computer program by a processor causes a method to be performed, the method comprising:
    inputting a plurality of compositions into a probabilistic content layout model;
    generating a plurality of pages by the probabilistic content layout model, such that for at least one page, there are multiple compositions that do not fit on the at least one page but rather continue over multiple of the pages and such that the at least one page has multiple breakpoints; and
    outputting the plurality of pages,
    wherein each breakpoint is defined in relation to a given composition, such that the breakpoint breaks the given composition on the page that includes the breakpoint and such that the given composition continues on a subsequent page, and in accordance with the probabilistic content layout model, where the breakpoint for a particular composition occurs on a given page is not pre-specified.

2. The non-transitory computer-readable data storage medium of claim 1, wherein each composition comprises a plurality of text blocks,
    and wherein each breakpoint of each composition occurs between successive text blocks of the composition.

3. The non-transitory computer-readable data storage medium of claim 2, wherein one or more of the compositions each comprises one or more images, each image associated with one of the text blocks of a same composition, and wherein each image is located close to the one of the text blocks with which the image is associated.

4. The non-transitory computer-readable data storage medium of claim 1, wherein each composition comprises a plurality of content blocks, and wherein generating the pages by the probabilistic content layout model comprises, for each page from a first page to a last page:

selecting a master template for the page, the master template comprising a plurality of regions; and fitting the regions of the master template for the page with at least some of the content blocks of the compositions.

5. The non-transitory computer-readable data storage medium of claim 4, wherein generating the pages by the probabilistic content layout model further comprises, for each page from the first page to the last page:

selecting a region template for each region of the master template for the page, the region template having one or more region aesthetics parameters governing how the region appears on the page; and setting the region aesthetics parameters of the regions of the master template for the page to maximize the region aesthetics parameters as a whole.

6. The non-transitory computer-readable data storage medium of claim 1, wherein each composition comprises a plurality of content blocks, and wherein generating the pages by the probabilistic content layout model comprises:

setting a current page to a first page;

setting a current set of content blocks to the content blocks of the compositions; and while the current set of content blocks is not empty, selecting a master template for the current page, the master template comprising a plurality of regions;

fitting at least a subset of the current set of content blocks into the regions of the master template for the current page;

removing the content blocks that have been fitted into the regions of the master template for the current page from the current set of content blocks; and setting the current page to a next page.

7. The non-transitory computer-readable data storage medium of claim 6, wherein generating the pages by the probabilistic content layout model further comprises, while the current set of content blocks is not empty:

selecting a region template for each region of the master template for the current page, the region template having one or more region aesthetics parameters governing how the region appears on the current page; and setting the region aesthetics parameters of the regions of the master template for the current page to maximize the region aesthetics parameters as a whole.

8. The non-transitory computer-readable data storage medium of claim 1, wherein the probabilistic content layout model specifies an aesthetic probability distribution for a document including the compositions, the document laid out over the pages, each page having a plurality of regions.

9. The non-transitory computer-readable data storage medium of claim 8, wherein the aesthetic probability distribution considers a master template for each page, and a region template for each region of each page.

10. The non-transitory computer-readable data storage medium of claim 9, wherein the aesthetic probability distribution considers a region aesthetic parameter for the region template for each region of each page.

11. The non-transitory computer-readable storage medium of claim 1, wherein no composition is part of another composition on any of the pages.

12. The non-transitory computer-readable data storage medium of claim 1, wherein the break in flow across multiple pages is dynamic and modified based on the various parameters and their prior probability distributions in accordance with the probabilistic content layout model.

13. The non-transitory computer-readable data storage medium of claim 1, wherein composition refers to a set of text blocks that are organized around a common theme.

14. The non-transitory computer-readable data storage medium of claim 1, wherein the composition is at least one of a blog entry, a journal article, and a newspaper article and includes one of i) a set of text blocks, and ii) the set of text blocks and at least one associated image.

15. A method comprising:

receiving, a plurality of content block series by a processor, each content block series including an ordered sequence of content blocks;

flowing the plurality of content block series over a plurality of pages, by the processor using a probabilistic content layout model, such that for at least one page, there are multiple content block series that do not fit on the at least one page but rather continue over multiple of the pages and such that the at least one page has multiple breakpoints; and outputting the plurality of pages by the processor, wherein each breakpoint is defined in relation to a given content block series, such that the breakpoint breaks the given content block series between two successive content blocks of the given content block series and over two of the pages, and in accordance with the probabilistic content layout model, where the breakpoint for a particular content block series occurs on a given page is not pre-specified.

16. The method of claim 15, wherein the probabilistic content layout model specifies an aesthetic probability distribution for a document including the compositions, the document laid out over the pages, each page having a plurality of regions.

17. The method of claim 15, wherein the compositions are physically separate from one another on the pages.

18. A system comprising:

a processor; and a computer-readable data storage medium to store a computer program executable by the processor and implementing a probabilistic content layout model, wherein the probabilistic content layout model is to:

receive a plurality of compositions;

generate a plurality of pages such that for at least one page, there are multiple compositions that do not fit on the at least one page but rather continue over multiple of the pages such that the at least one page has multiple breakpoints, and output the plurality of pages, and wherein each breakpoint is defined in relation to a given composition, such that the breakpoint breaks the given composition on the page that includes the breakpoint and such that the given composition continues on a subsequent page, and in accordance with the probabilistic content layout model, where a break in flow of a particular composition occurs on a given page is not pre-specified.

19. The system of claim 18, wherein the probabilistic content layout model specifies an aesthetic probability distribution for a document including the compositions, the document laid out over the pages, each page having a plurality of regions.

20. The system of claim 18, wherein no composition is part of another composition on any of the pages,
and wherein the compositions are physically separate from one another on the pages.

* * * * *

UNITED STATES PATENT AND TRADEMARK OFFICE
CERTIFICATE OF CORRECTION

PATENT NO. : 10,223,348 B2  
APPLICATION NO. : 14/364726  
DATED : March 5, 2019  
INVENTOR(S) : Ildus Ahmadullin et al.

Page 1 of 1

It is certified that error appears in the above-identified patent and that said Letters Patent is hereby corrected as shown below:

On the Title Page

In Column 1, item (54), Title, Lines 1-3, delete "HIERARCHICAL PROBABILISTIC DOCUMENT MODEL BASED DOCUMENT COMPOSITION" and insert -- PROBABILISTIC CONTENT LAYOUT MODEL FLOWING MULTIPLE COMPOSITIONS OVER MULTIPLE PAGES VIA MULTIPLE BREAKPOINTS --, therefor.

In Column 2, item (57), Abstract, Line 7, delete "on," and insert -- on --, therefor.

In the Specification

In Column 1, Lines 1-3, delete "HIERARCHICAL PROBABILISTIC DOCUMENT MODEL BASED DOCUMENT COMPOSITION" and insert -- PROBABILISTIC CONTENT LAYOUT MODEL FLOWING MULTIPLE COMPOSITIONS OVER MULTIPLE PAGES VIA MULTIPLE BREAKPOINTS --, therefor.

Signed and Sealed this  
Twenty-eighth Day of January, 2020

Andrei Iancu  
*Director of the United States Patent and Trademark Office*